United States Patent [19]

Rafson et al.

[11] 4,302,226
[45] Nov. 24, 1981

[54] APPARATUS FOR NEUTRALIZING ODORS

[75] Inventors: Harold J. Rafson, Highland Park, Ill.; Egbert deVries, Kettering, Ohio

[73] Assignee: Quad Environmental Technologies Corp., Highland Park, Ill.

[21] Appl. No.: 103,321

[22] Filed: Dec. 14, 1979

Related U.S. Application Data

[63] Continuation of Ser. No. 955,341, Oct. 27, 1978, abandoned.

[51] Int. Cl.³ .............................................. B01D 47/06
[52] U.S. Cl. ..................................... 55/238; 239/102; 261/79 A; 261/115; 261/DIG. 17; 422/124
[58] Field of Search ........................ 55/235, 237, 238; 239/102; 261/1, 79 A, 115, DIG. 17; 423/220, 224; 422/123, 124

[56] References Cited

U.S. PATENT DOCUMENTS

| | | | |
|---|---|---|---|
| 2,532,554 | 12/1950 | Joeck | 261/1 X |
| 3,240,254 | 3/1966 | Hughes | 239/102 X |
| 3,358,413 | 12/1967 | Kalika | 261/79 A X |
| 3,550,356 | 12/1970 | Abboud | 55/238 X |
| 3,581,467 | 6/1971 | Donnelly | 261/79 A X |
| 3,620,509 | 11/1971 | Roman | 55/238 X |
| 3,729,898 | 5/1973 | Richardson | 55/238 X |
| 3,923,955 | 12/1975 | Fattinger | 423/220 X |
| 3,933,450 | 1/1976 | Percevaut | 55/238 X |
| 3,944,402 | 3/1976 | Cheremisinoff | 261/79 A X |
| 3,989,488 | 11/1976 | Wisting | 55/238 |
| 4,125,589 | 11/1978 | deVries | 423/224 X |

FOREIGN PATENT DOCUMENTS

1152705  5/1969  United Kingdom ................ 423/224

*Primary Examiner*—Richard L. Chiesa
*Attorney, Agent, or Firm*—Fidelman, Wolffe & Waldron

[57] ABSTRACT

Apparatus, particularly adapted to the removal of odorous constituents from waste gas streams, is described. The apparatus comprises a treatment vessel or chamber preferably of cylindrical shape containing a coaxially-mounted exhaust duct which serves also as a columnar support for the chamber top or roof. As odorous gas is introduced tangentially into an upper portion of the reactor and is caused to move in a spiral flow around the central column. A finely-divided spray of a reagent reactive toward the odorous compound is introduced into the chamber through nozzles ringing the chamber wall or mounted in the chamber roof. Reagent droplets coalesce on the chamber floor and are removed from the vessel. The treated gas exhausts up the central duct through openings located near the bottom thereof.

11 Claims, 3 Drawing Figures

APPARATUS FOR NEUTRALIZING ODORS

This is a continuation, of application Ser. No. 955,341, filed Oct. 27, 1978, now abandoned.

BACKGROUND OF THE INVENTION

This invention relates generally to apparatus for the removal of odorous constituents from gas streams. More particularly, this invention relates to an apparatus for the extended contact of very finely divided liquid droplets with a gas stream whereby the odorous constituents react with the reagent droplets to purify the gas.

Offensive odors which are characteristic of many chemical process industries are often difficult and costly to eliminate or control. Examples include rendering plants, dog food producers, sewage sludge digestion plants, flavors and fragrances production and fermentation processes. Although there are presently no federal regulations for odor control, local laws are often sufficiently stringent to enable authorities to act on complaints and levy stiff fines or, in some cases, even close plants.

There have been a number of approaches taken to the control of odors. Possibly the simplest has been merely to dilute the odorous gas with large quantities of air and hope for the best. Attempts have been made to mask offensive odors with more pleasant ones, but this approach has not been particularly successful as the new odor mixture also was unpleasant or the improved odor could not be sustained. A more radical approach to odor control has been by incineration. This is often a very costly approach as the entire odorous gas stream must be subjected to combustion temperatures.

Another common approach to odor control is by chemical neutralization of the odorous compounds. The odorous gas is conventionally washed with an aqueous solution of a reactive chemical in spray towers, packed beds and the like. Chemical agents commonly used for this purpose include permanganates, dichromates, acids, hypochlorite solutions, hydrogen peroxide and other common oxidizing agents. Exemplary processes are described in British Pat. No. 1,152,705 and in U.S. Pat. No. 3,923,955.

Another technique for the chemical neutralization of odors is described in copending commonly assigned patent application Ser. No. 649,696, now U.S. Pat. No. 4,125,589. That application describes introducing odorous gases such as those produced in rendering operations into the top of a relatively large open tower. An aqueous solution of an oxidizing agent such as hypochlorite is introduced into the tower through nozzles in the form of a very finely-divided spray. Sizing of the tower is adjusted to the gas flow rate so that an extended contact time between the reagent droplets and the gas is achieved. Because of the vast effective surface area generated by the finely-divided droplets, essentially complete removal of chemically reactive odorous constituents is achieved in a single stage treatment. However, because of the relatively large reactor required by this process, field construction and assembly can present difficulties.

SUMMARY OF THE INVENTION

This invention provides an apparatus for the treatment of odorous gas streams. It comprises a vertically oriented, cylindrical gas treatment vessel having a gas entry means disposed near the top and liquid exit means at the bottom. A coaxial, columnar duct extends from the floor to the roof of the tank and functions both as a structural support member for the tank and as a gas exit duct. Port means are provided near or at the bottom of the columnar duct and an induced draft fan may be mounted within the duct at a point above the vessel roof. A plurality of nozzles are arranged in an upper part of the vessel to direct a very finely-divided liquid reagent spray into the annular area between the vessel wall and the duct.

Hence, it is an object of this invention to provide an apparatus for the treatment of gas streams.

Another object of this invention is to provide gas treatment apparatus of simple construction which may be prefabricated.

DETAILED DESCRIPTION OF THE INVENTION

This invention finds use in the removal of odorous, noxious, or otherwise undesirable contaminants from waste gas streams such as those produced in a treatment or conversion of animal, vegetable, or other organic materials. The invention will be better understood by reference to the drawings, which depict details of the gas treatment apparatus.

Figure 1:
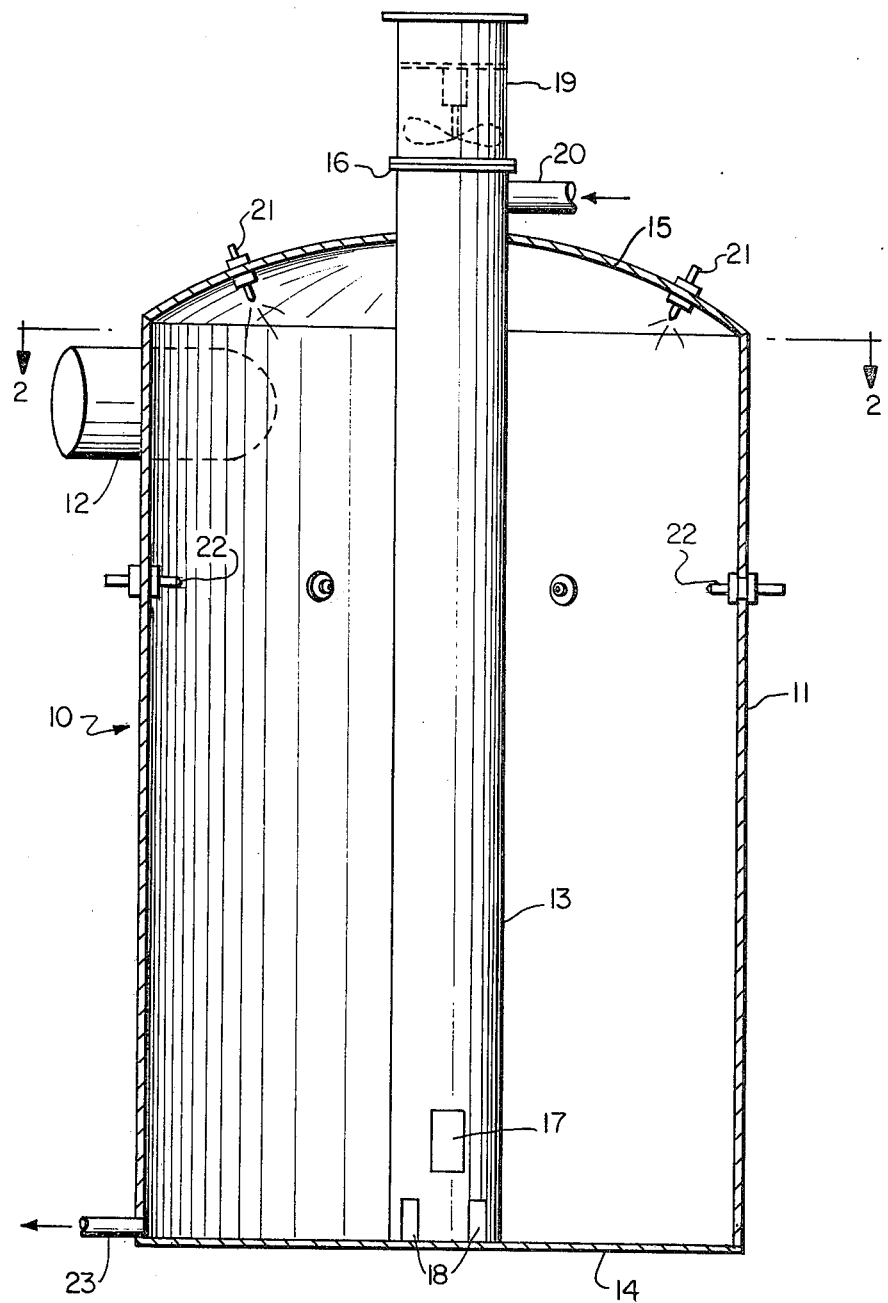
FIG. 1 is a partial sectional view of the apparatus of this invention.
Figure 2:
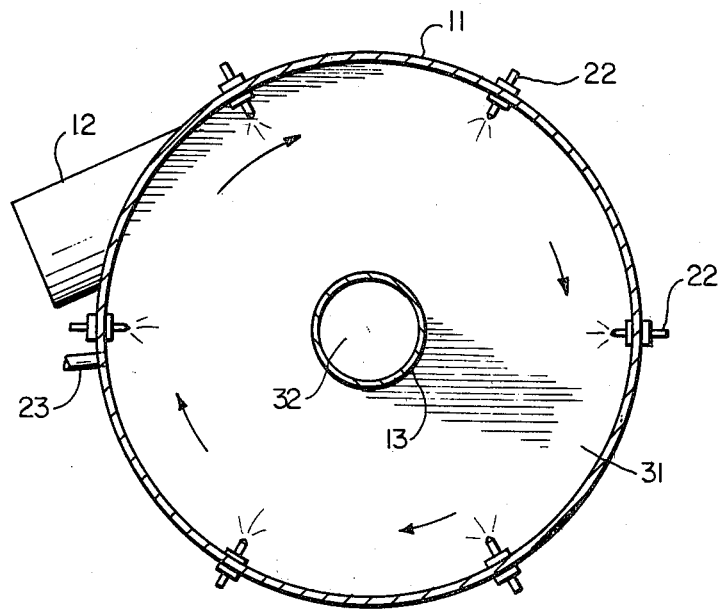
FIG. 2 is a sectional view of the apparatus depicted in FIG. 1, the view being taken on line 2—2.
Figure 3:
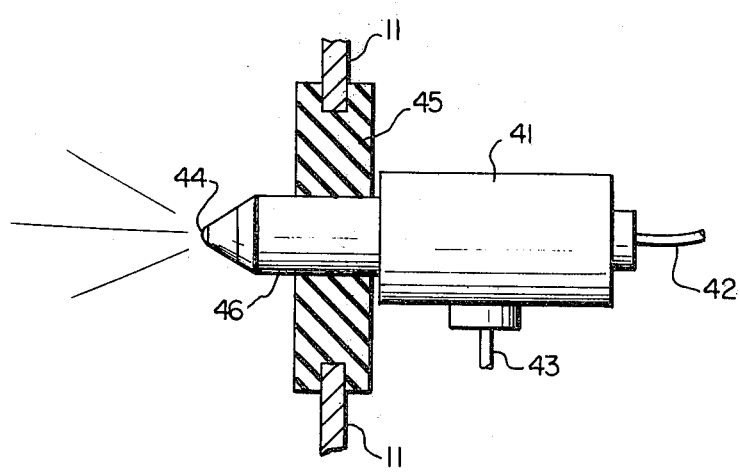
FIG. 3 depicts a preferred means for mounting spray nozzles in the apparatus of this invention.

Referring now to FIG. 1, the gas treatment apparatus is shown in a partial sectional view and is generally depicted at 10. The device comprises a closed, cylindrical vessel 11 oriented with its axis essentially vertical. A gas entry means 12 is provided near the top of vessel and is preferably oriented so that gas enters the vessel tangentially. A columnar duct 13 is mounted in coaxial relationship with vessel 11 and extends from the floor 14 to the roof 15 of the vessel. Preferably, duct 13 extends to a level above the roof 15 and terminates in a flange or other connector 16 for attachment to a duct fan, a stack or other duct. Ports 17 and 18 are provided near the lower end of the duct. At least one of the ports is located at the floor level of vessel 11 so as to allow liquid drainage from the interior of the duct. A liquid exit port 23 is provided on one side of the vessel at its bottom. It is preferred that floor 14 be provided with a slight downward grade toward the liquid exit port.

Duct 13 functions as the gas exit means for vessel 11. It is fixedly attached to roof member 15 and, at its lower end, to vessel floor 14, thus forming a structural support member for vessel 11. An induced draft fan 19 is preferably mounted above duct 13 at a level above the vessel roof. Duct 13 may also be provided with a diluent gas entry port 20 located at a level above the vessel roof but below the induced draft fan. Addition of a diluent gas such as air to the exiting gas stream tends to reduce or eliminate the vapor plume which might otherwise be created as the essentially saturated treated gas is released to the atmosphere.

A plurality of liquid spray nozzles are mounted at an upper level of vessel 11 to direct the spray plume into the annular area between columnar duct 13 and the vessel wall. The nozzles may be mounted in an evenly spaced pattern in the vessel roof as is depicted at 21 or may be arranged in a ring about the upper portion of the vessel as is depicted at 22. In the latter case, it is preferred that the nozzles be mounted just below gas entry means 12.

Nozzles 21 or 22 must be capable of delivering a very finely-divided spray having a median particle diameter of about 10 microns or less. Liquid droplets of this particle size display a very low settling velocity in air and provide an extremely large reactive surface to the gas being treated. Both of these properties are essential for the proper functioning of the apparatus. Suitable nozzles are those generally referred to as supersonic nozzles such as those described in U.S. Pat. No. 2,532,554 or 3,240,254.

FIG. 2 is a vertical section of the apparatus of FIG. 1 taken along lines 2—2. As is depicted by the arrows, a gas stream enters the reactor vessel tangentially through port 12 and travels in a generally downward spiral about columnar duct 13. The diameter ratio of duct 13 to vessel 11 is always such that the annular reaction area 31 is substantially greater than the area 32 defined by the duct. Diameters of the two structural elements may vary over a fairly broad range depending upon the reaction time required; the longer the reaction time the smaller will be duct 13 in relation to vessel 11. The diameter ratio of duct 13 to vessel 11 may broadly range from about 1:20 to 1:2.

In most practical applications of this apparatus, the height will range from about 10 to 50 feet and the diameter will range about 5 to 20 feet. A practical maximum diameter for prefabricated units is 12 feet as this is the largest load allowed on most highways. Diameter of the columnar duct in a 12 foot diameter reaction vessel would typically range from about 1 to 5 feet. The material used in construction of the vessel and duct is typically fiberglass but light, corrosion resistant metal can also be utilized. As may now be appreciated, provision of the columnar duct within the reaction vessel not only allows substantial prefabrication of the apparatus but increases its strength and rigidity as well.

FIG. 3 shows the nozzle and its mounting in more detail. Nozzle 41 is supplied with a pressurized gas which suitably may be air but also may be steam, nitrogen, or other gases, by way of conduit 42. A liquid reagent, typically an aqueous solution of a oxidizing agent, is supplied to the nozzle by way of conduit 43. The nozzle, which may be that disclosed in U.S. Pat. No. 3,240,254, is constructed to cause the gas to expand, accelerate, and issue from the nozzle in the form of a low pressure stream having supersonic velocity. The liquid introduced into the nozzle is atomized into very tiny droplets by the action of high energy sonic pressure waves which are generated by impingement of the high velocity gas stream into a pulsator cavity 44.

In a preferred embodiment the nozzles are mounted in vessel 11 as is shown in FIG. 3. A relatively large hole is drilled through the vessel wall 11 to accommodate grommet 45 which is of rubber or other resilient material. The grommet is sized to provide a gripping fit with the circular fore-part 46 of the nozzle. Gas line 42 and liquid line 43 are preferably flexible and are each connected to common headers serving all of the nozzles. Provision of flexible lines allows the nozzle to be easily removed from its mounting for inspection, cleaning, or servicing.

The apparatus of this invention finds particular use in such application as the treating and neutralization of odorous waste gases from rendering plants and similar installations. For this particular use, the apparatus is sized so as to provide a gas retention time within the vessel of at least about 10 seconds and preferably 20 seconds or more. Deodorization of other gases, for example the gases produced by coffee roasting, may be accomplished with shorter contact times so the apparatus may be sized accordingly.

I claim:

1. Gas treatment apparatus consisting essentially of a closed cylindrical vessel;

gas entry means disposed in an upper portion of said vessel, said entry means arranged to cause gas to tangentially enter the vessel;

a columnar duct with an unobstructed interior area having gas exit means in a lower portion disposed coaxially within said vessel and extending continuously from the vessel floor to the vessel roof, said duct fixedly attached to both said floor and said roof to form a structural support for said vessel and to define an annular area between said duct and the vessel wall, said area providing an unobstructed passage for gas flow from said gas entry to said gas exit;

a plurality of nozzles disposed in an upper portion of said vessel, said nozzles adapted to inject a very finely divided liquid spray having a median droplet diameter less than about 10 microns into only said annular area formed by the vessel wall and the columnar duct, and liquid exit means communicating between the floor of said annular area and the exterior of said vessel.

2. The apparatus of claim 1 wherein the area of said annulus is substantially larger than the area of said columnar duct.

3. The apparatus of claim 2 wherein the nozzles are mounted in a spaced pattern in the roof of said vessel.

4. The apparatus of claim 3 including nozzle mounting means, said mounting means comprising a resilient grommet sized to provide a gripping fit with a forepart of said nozzle.

5. The apparatus of claim 2 wherein the nozzles are arranged in a ring circling said vessel.

6. The apparatus of claim 5 including nozzle mounting means, said mounting means comprising a resilient grommet sized to provide a gripping fit with a forepart of said nozzle.

7. The apparatus of claim 2 wherein said columnar duct extends through and to a level above the roof of said vessel.

8. The apparatus of claim 7 wherein an induced draft fan is mounted within said duct at a point above the roof of said vessel.

9. The apparatus of claim 8 including a diluent gas entry port at a level above the vessel roof but below said induced draft fan.

10. The apparatus of claim 2 wherein the floor of said vessel grades downwardly toward said liquid exit means.

11. The apparatus of claim 2 wherein at least one port of said gas exit means is located at the floor level of said vessel.

* * * * *